(12) United States Patent
Armstrong (10) Patent No.: US 7,086,325 B2
(45) Date of Patent: Aug. 8, 2006

(54) SINGLE SENSOR PRESS SYSTEM

(75) Inventor: Richard Armstrong, Corona, CA (US)

(73) Assignee: Casa Herrera, Inc., Ponona, CA (US)

( * ) Notice: Subject to any disclaimer, the term of this patent is extended or adjusted under 35 U.S.C. 154(b) by 269 days.

(21) Appl. No.: 10/618,169

(22) Filed: Jul. 11, 2003

(65) Prior Publication Data

US 2005/0006208 A1   Jan. 13, 2005

(51) Int. Cl.
*A23L 1/00* (2006.01)
*G01N 3/08* (2006.01)

(52) U.S. Cl. ............................ 99/353; 99/349; 73/829; 73/857

(58) Field of Classification Search ........ 356/213–234; 73/829, 857; 99/353, 337, 349; 426/231, 426/138; 414/790.8
See application file for complete search history.

(56) References Cited

U.S. PATENT DOCUMENTS

| | | | | |
|---|---|---|---|---|
| 4,874,264 A | * | 10/1989 | Suzuki et al. ............... 400/335 |
| 4,905,581 A | * | 3/1990 | Kirkpatrick ................... 99/353 |
| 4,938,126 A | * | 7/1990 | Rubio et al. ................... 99/349 |
| 5,231,919 A | * | 8/1993 | Lawrence et al. ............ 99/334 |
| 5,630,358 A | * | 5/1997 | Patel ............................ 99/349 |
| 5,762,536 A | * | 6/1998 | Pant et al. ...................... 451/6 |
| 6,050,148 A | * | 4/2000 | Staples et al. ................ 73/829 |
| 6,053,695 A | * | 4/2000 | Longoria et al. ......... 414/790.8 |
| 6,157,014 A | * | 12/2000 | Goranson .................... 219/700 |
| 6,558,720 B1 | * | 5/2003 | Karner ........................ 426/231 |

* cited by examiner

*Primary Examiner*—Gregory J. Toatley, Jr
*Assistant Examiner*—Sang H. Sang
(74) *Attorney, Agent, or Firm*—Myers Dawes Andras & Sherman LLP; Joseph C. Andras (57) ABSTRACT

A tortilla press utilizing a single sensor provides improved efficiency and accuracy. The press has a belt driven by a motor and a platen driven by a hydraulic cylinder. The motor is controlled by an AC inverter. A programmable logic controller (PLC) controls the AC inverter and hydraulics associated with the hydraulic cylinder of the platen. The PLC coordinates the movement of the belt and the movement of the platen. A sensor detects detectible elements on the belt and sends a signal to the inverter to initiate stopping of the belt. The inverter detects the zero hertz from the motor once the motor and belt have stopped and sends a signal to the PLC indicating that the belt has stopped. The PLC in turn passes a command that sends a signal to bring the platen down.

23 Claims, 7 Drawing Sheets

SINGLE SENSOR PRESS SYSTEM

BACKGROUND OF THE INVENTION

1. Field of the Invention

The instant invention lies generally in the field of tortilla presses, and more specifically deals with actuation means for different parts of the press or for initiating different steps of the process of making tortillas with the press.

2. Disclosure of the Prior Art

The prior art has tortilla presses with actuation means for stopping and starting an endless belt and for lowering and raising a tortilla press. However the prior art is deficient in a variety of ways. Overall, the prior art utilizes old technology and methods that are inadequate with regard to precision, flexibility, and efficiency.

Firstly, the closest prior art presses employ two proximity sensors that work together. The first sensor senses a separate element held in position on the endless belt and sends a signal to the belt drive to stop the belt. The first sensor also sends a signal to a processor. The second sensor senses the separate element a short period of time after the first sensor does and sends a signal to the processor. By use of at least one timer, the processor estimates the needed time for the belt to completely stop and then waits an additional period after that to provide a safety factor before sending a signal to the tortilla press platen actuator to cause the platen to descend and press the tortillas. This arrangement and process of the prior art is costly in time and accuracy.

Secondly, the sensors utilized in the prior art are proximity sensors and the detectable elements utilized by the prior art presses are therefore usually metal strips that have to be adhered to the belt or placed in pockets to hold the metal strips in place on the belt. This arrangement is inadequate because it is inflexible. That is, only a few types of elements will effectuate sensing by the proximity sensor. Also, the attachment is labor intensive and the location of the detectable elements relatively permanent. Thus, the prior art systems and methods are inflexible.

Thirdly, the sensing of the prior art does not utilize direct feedback, but relies on calculations, estimates, and timers. This prior art approach is inadequate because it requires the addition of a safety factor to assure that the belt is stopped before the platen is brought down. Even the calculations and estimates may cause lost time since some cycles or speeds require less time than others. Hence, the prior art is deficient in achieving the greatest possible efficiency.

Fourthly, another way in which the prior art devices are inadequate is in the location of the sensors. The sensors of the prior art have been located at a position along the belt at which the belt has relatively high slack in a direction perpendicular to the direction of travel of the belt. Such a position is likely to give erroneous readings since the detectable element is not constrained to a single path as it passes the sensor. That is, the detectable element may be "bouncing" as it passes the sensor, as well as traveling along with the belt.

SUMMARY OF THE INVENTION

The single sensor system for a tortilla press of the instant invention overcomes the inadequacies and deficiencies of the prior art in that it provides greater efficiency, accuracy, and flexibility.

The improved efficiency of the single sensor system of the instant invention is due to the direct feedback from the belt drive motor to the system in order to initiate bringing down the platen of the tortilla press. That is, when the frequency of the belt drive motor is zero, then the platen decent is initiated immediately. Discovery that this could be done obviated the need for the second sensor, the timer(s), the calculation of approximately how long the belt would over-run after the signal to stop, and the safety factor of additional time programmed into the system. As such, the efficiency has been increased. The time savings with the instant invention is approximately 0.2 seconds per cycle. That is, every time the platen comes down, the instant invention shaves 0.2 seconds from the time that otherwise would have been required. Reiterating an improvement by the instant invention that provides greater efficiency, the direct detection of the motor having zero hertz obviates the need for a second sensor and the need for the built-in safety factor utilizing timers and preprogrammed estimated time delays.

The accuracy has similarly been improved. Tolerance stacking that was necessary in the prior art has been reduced to almost nothing since there is no safety factor required and no estimated time for over-run. Furthermore, the system utilizes an AC inverter that is capable of pre-programming the system to always stop the belt at the same distance past the point at which the stop signal was sent. This feature and the specifics of the pre-programming take into account the speed of the belt at the time the stop was initiated and applies a pre-selected deceleration starting at the precise time necessary for stopping the belt at the same position past the point at which the stop signal was sent every time.

Additionally, the accuracy of the instant invention has been further assured by locating the sensor at a position along the belt that is juxtaposed to a roller, with the belt lying between the roller and the sensor. This assures that there will be no "bouncing" of the belt in a direction perpendicular to the direction of travel of the belt. Thus, the readings of the sensor are more consistently accurate.

The flexibility of the instant invention has been greatly enhanced by utilizing an optical sensor instead of proximity sensors. Recent technology now permits the use of optical sensors that can be trained to respond to a range of colors. This is accomplished by detecting and recording the background and detectable element colors. The detectable elements may be in the form of marks that can be painted on, taped on, or colored onto the belt. These marks may be permanent or semi-permanent and may be easily covered, removed, or re-located. Hence, the instant invention provides an added measure of flexibility.

In a nutshell, the single sensor actuation system for a driven belt of a tortilla press of the instant invention has: a signal emitting and retrieving sensor producing an emitted signal, an AC inverter with the sensor connected to the inverter, at least one detectable element on the belt and sensed by the sensor when the detectable element is aligned with the emitted signal of the sensor, a platen for pressing tortillas on the belt, the sensor retrieving a reflected signal from the detectable element and sending a sensor return signal to a drive of the belt to stop the belt in response to the retrieving when the at least one detectable element is aligned with the emitted signal of the sensor, the AC inverter sending a signal to an actuator of the platen to bring the platen down to press at least one tortilla when the belt drive has stopped.

In one aspect of the invention, the inverter includes a switch, and the motor has a lead connecting the motor to the inverter so that the switch closes when a motor driving the belt goes to zero hertz.

In another aspect of the invention, the inverter and an associated Programmable Logic Controller (PLC) receive the sensor return signal from the sensor when a detectable element is detected by the sensor, and the inverter stops the drive of the belt through a pre-programmed vector curve that is provided as an integral part of the inverter so that the belt moves a set distance past the point at which the retrieved signal was received by the inverter, so that the belt travel after a retrieved stop signal is the same independent of the belt's original speed.

Consistency of a stopping distance achieved by the instant invention enables a reduction in belt length of more than six percent. Related to this achievement, the consistency of the stopping distance further enables a reduction of approximately two tenths of a second per stroke of the platen.

Coordination of the various parts of the tortilla press is effectuated by the PLC. The sensor return signal received by the PLC satisfies a condition in a ladder logic of the PLC and prepares the ladder logic program to receive a subsequent condition of the belt drive going to zero hertz. The inverter detects zero hertz in the belt drive and automatically sends a drive stop signal via a wire to the PLC. The drive stop signal is received by the PLC and satisfies another condition of the ladder logic. Then the ladder logic effectuates a command to bring the platen down. In a last step of the cycle, the ladder logic effectuates a command to bring the platen back up after a predetermined length of time.

The ladder logic automatically starts a new cycle when it automatically sends a signal to the inverter to restart the drive immediately upon bringing the platen up. This provides for minimal loss of time and space on the belt.

It is to be understood that the sensor can be a fiber optic light sensor with capabilities of sensing multiple shades of color from the detectable element, and wherein the detectable element is a colored mark of a predetermined range of shades and of a pre-selected color on the belt. The sensor can be directly connected to a terminal block in the AC inverter and can send a sensor return signal to a drive of the belt to stop the belt in response to the retrieval of the reflected signal when the at least one detectable element is aligned with the emitted signal of the sensor.

The instant invention is also embodied in the method of actuating a second part of a tortilla machine in response to a detected position of a first part of the machine and includes: detecting a first position of the first part the machine by a sensor; sending a signal from the sensor to an AC inverter when the first position is detected by the sensor; stopping the first part of the machine by a signal from the inverter to a drive of the first element; stopping the first part of the machine at a predetermined second position different from the first position; and actuating the second part of the machine when a signal from the drive of the first part of the machine goes to a zero value.

As set forth above, the inverter has a switch that is normally open when connected to a non-zero frequency signal from the drive. The method of the invention further comprises maintaining the switch open by sending the signal from the drive to the switch and the actuating being initiated by closing the switch when the signal goes to zero frequency when the drive is stopped.

As discussed above, the first part has a detectable element and the tortilla machine has a sensor for detecting the detectable element. The method further comprises: detecting the position of the first part by sensing the detectable element on the first part by the sensor, retrieving a returned signal from the detectable element, and sending the returned signal to the inverter.

Furthermore, the detectable element can be a colored mark on the first part, the sensor can be a fiber optic sensor, and the steps of detecting and retrieving can further comprise: sending a beam from the sensor to strike the detectable element when the detectable element is aligned with the beam, retrieving a reflected beam from the detectable element by the same sensor, and sending an electrical signal converted from the reflected beam to the inverter.

The method of the instant invention further comprises the preliminary step of teaching the sensor the color of the detectable elements so that it is sensitive to the shades of the color that will be present during use.

The tortilla press of the instant invention can further comprise a Programmable Logic Controller (PLC) as set forth above. The method can thus further comprise: sending the return signal to the PLC and stopping the first part by way of the return signal that was sent to the inverter. The step of stopping can further comprise: stopping the drive of the belt through a pre-programmed vector curve that is provided as an integral part of the inverter so that the belt moves a set distance past the point at which the retrieved signal was received by the inverter so that the belt travel after a retrieved stop signal is the same independent of the belt's original speed.

Of course, the method can include reducing the necessary length of the belt by more than six percent by increasing the consistency of a stopping distance by the single sensor and the pre-programmed vector curve. Related to the reduction in required belt length is the reduction in required time for each cycle. The cycle time is reduced by the instant invention by approximately two tenths of a second by increasing the consistency of a stopping distance by the single sensor arrangement and the pre-programmed vector curve. The required length of belt is reduced by approximately six percent.

Advantageously, the method comprises: coordinating movement of the first part of the tortilla press with movement of the second part of the tortilla press by way of the PLC; satisfying at least one condition of ladder logic in the PLC by receiving the sensor return signal in the PLC; detecting zero hertz in the belt drive by the inverter and automatically sending a drive stop signal to the PLC; satisfying at least another condition of the ladder logic in the PLC by receiving the drive stop signal in the PLC; and effectuating a command by the ladder logic to bring the platen down. The method also includes effectuating a command by ladder logic to bring the platen back up after a predetermined length of time. The method further comprises automatically sending a restart signal by ladder logic control to the inverter to restart the belt drive with minimal loss of time and space on the belt. This begins a new cycle, the steps of which will be substantially the same as the first described cycle of the method.

The invention having been described generally, will be better understood in light of the following brief description of the drawings and the detailed description of the preferred embodiments in with particular reference to the accompanying drawings.

DETAILED DESCRIPTION OF THE PREFERRED EMBODIMENTS

Figure 1A:
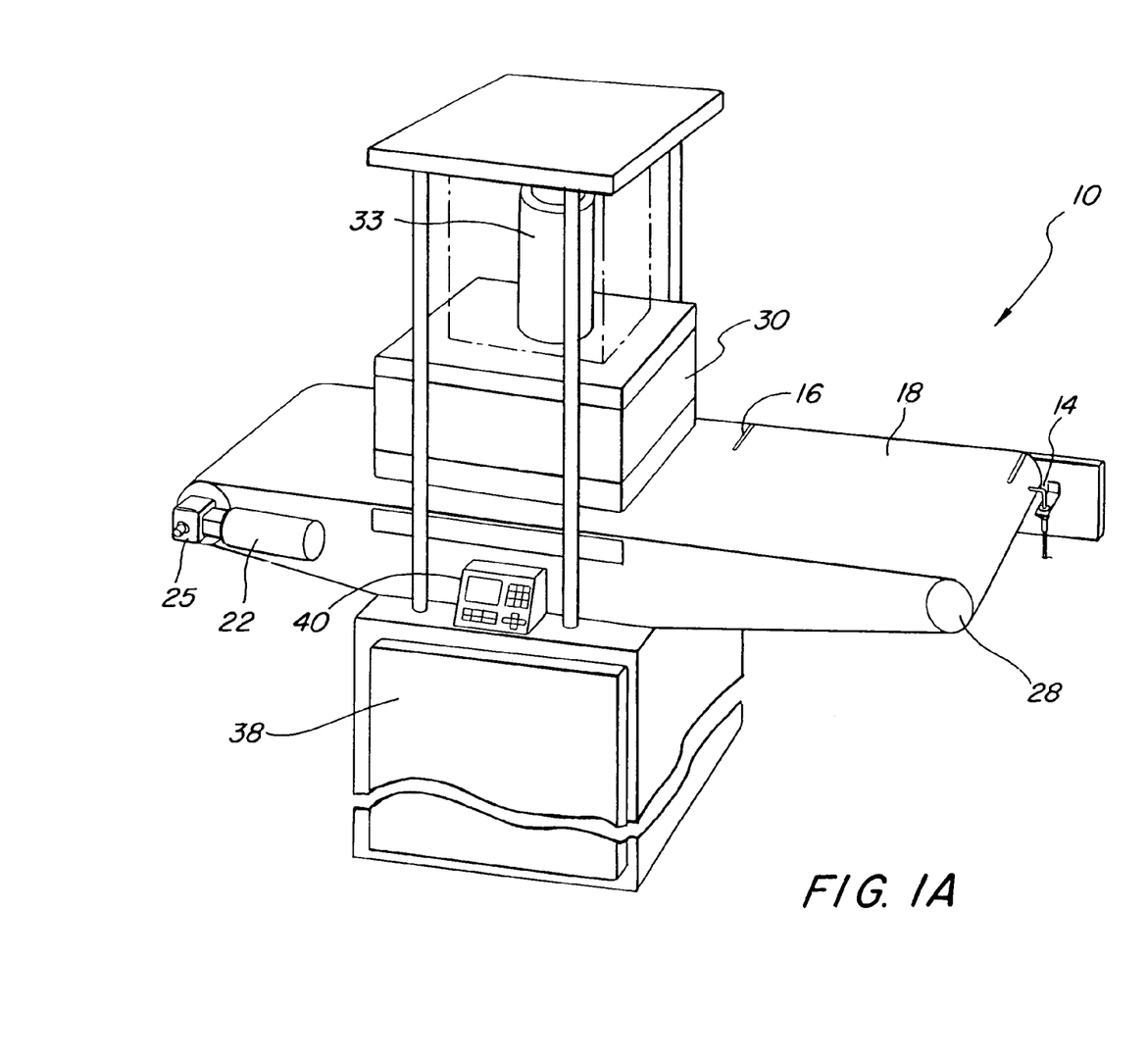
FIG. 1A is a perspective view of a tortilla press incorporating the single sensor system of the instant invention.

FIG. 1A is a perspective view of a tortilla press 10 incorporating a single sensor 14 into the system of the instant invention. The tortilla press 10 has a belt 18 for moving tortillas through the press. The belt has detectible elements 16 along one edge. The sensor 14 is aligned with the detectible elements 16 so that, as the belt moves, the detectible elements pass by the sensor 14. While the sensor may be any of a variety of sensors available, in the preferred embodiment, sensor 14 is an optical sensor. This optical sensor 14 is capable of detecting colors. One such sensor is provided by Banner Engineering Corp. and is a BANNER MINI BEAM SME312FDQD with a fiber optic line BTA26S.

The belt 18 is driven by a motor 22. The motor drives the belt 18 via a gearbox 25. The motor 22 may be any of a variety of motors available on the market. However, the motor of a preferred embodiment is an inverter-grade motor. One such motor is provided by Nord and is a Fremdlufter EF71. The belt 18 is guided by and supported on rollers 28. The belt 18 and rollers 28 define a path that carries tortilla dough under the press platen 30. The platen 30 is moved up and down by a hydraulic cylinder 33.

The coordination of the belt movement by the motor 22 and the movement of the platen 30 by way of the hydraulic cylinder 33 is coordinated by controls in control box 38 of the press 10. The controls comprise a variety of elements in the control box 38 that control the tortilla press in accordance with user input through input/output device 40. Signals from the sensor 14 and from the motor 22 help to coordinate the movement of the various components of the press 10.

Figure 1B:
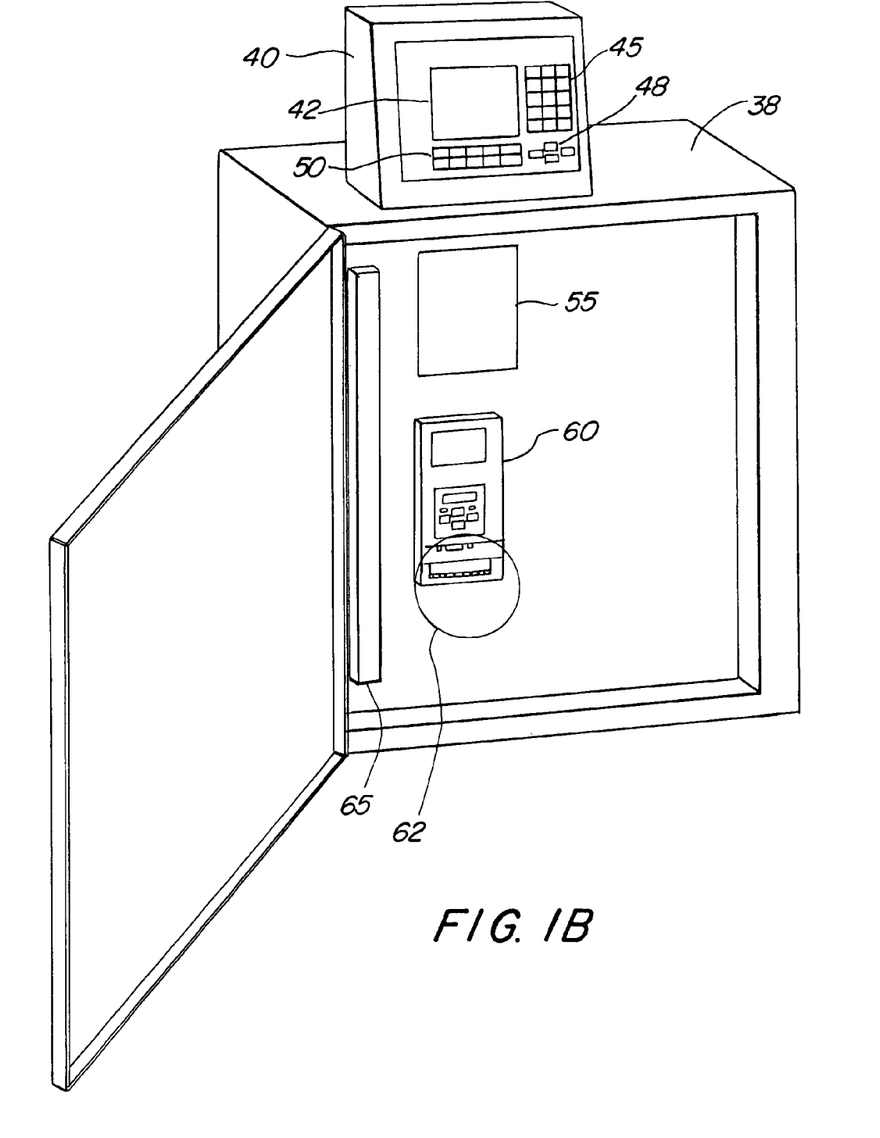
FIG. 1B is a perspective view of the control box of the instant invention.

As shown in FIG. 1B, the input/output device 40 includes and input/output screen 42, a numerical pad 45, a cursor positioning means 48, and function keys 50. The input/output device serves as a user interface with a programmable logic controller (PLC) 55. Any of the variety PLCs 55 may be utilized. However, in the instant invention, the PLC 55 is preferably made by Alan Bradley and is a model SLC 5/04. The input/output device 40 is likewise preferably an Alan Bradley panel view 600. The logic in a preferred embodiment is programmed as ladder logic in the Rockwell software program RSLogix 500.

The control box 38 houses several components including the PLC 55, an inverter 60, and a terminal block 65. The inverter 60 is an AC inverter capable of operating with a power supply of 208/230/460 volts AC at 50/60-hertz input. Any of the variety of AC inverters may be employed with the instant invention. However, in a preferred embodiment, the AC inverter 60 is a KEBCO INV1 F4. The inverter 60 has the function of interacting with the PLC 55 and the motor 22. The AC inverter 60 specifically converts the incoming three-phase power into a power supply to the motor at very specific frequencies or rates of pulses. This permits the motor 22 to be started and stopped at very specific increments or intervals, thus providing very specific travel distances for the belt 18.

Figure 2:
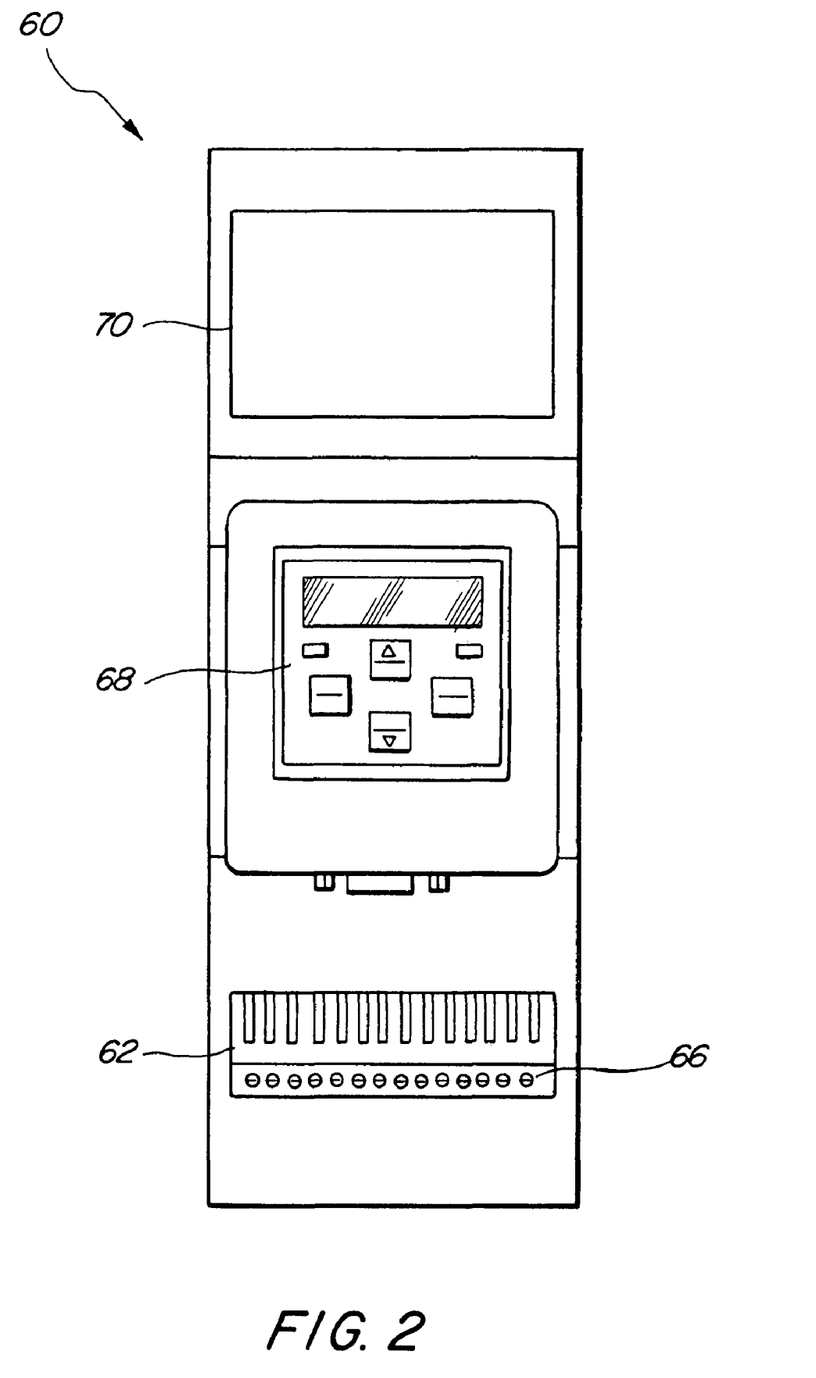
FIG. 2 is a front plane view of the AC inverter.

FIG. 2 is a front plane view of the KEBCO F4 AC inverter 60. As shown in FIG. 2, the AC inverter has a terminal block 62 with 14 terminals and corresponding connection screws 66 at each of the terminals. Inverter 60 also has a control panel 68. Specification panel 70 includes the rated capacity of the inverter 60.

Figure 3:
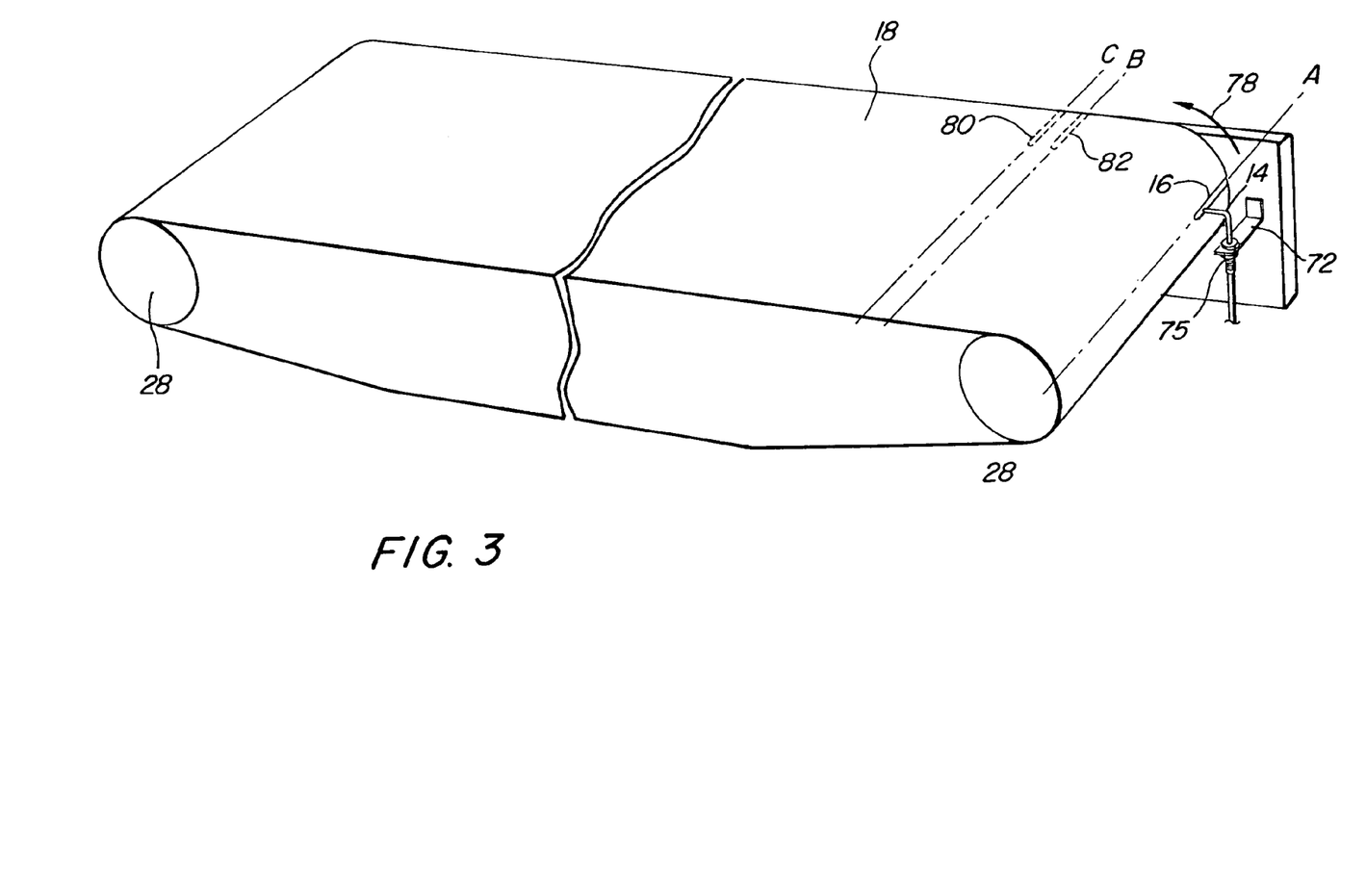
FIG. 3 is a perspective view of the belt and sensor showing the effects of over-run.

FIG. 3 shows a belt 18 on its rollers 28 and depicts the over-run of the belt after the stop signal has been received. As shown in FIG. 3, the belt 18 travels in a direction of arrow 78. As the belt 18 moves past the sensor 14, detectible elements 16 pass in front of sensor 14 and are detected by the sensor 14. In operation, sensor 14 sends a signal to the AC inverter 60 and to the PLC 55 when a detectible element 16 moves in front of the sensor 14. In turn, a stop signal is initiated and power to motor 22 is brought to zero. In the prior art, the minimum over-run of the detectible element 16 is depicted by the movement of the detectible element 16 from an axis A to a position 80 on axis C. With the instant invention, the minimum over-run is less than in the prior art and is depicted by the relative position of detectible element 16 shown at 82 on axis B. This savings of required distance traveled also represents a savings in time enabled by the instant invention.

Figure 4:
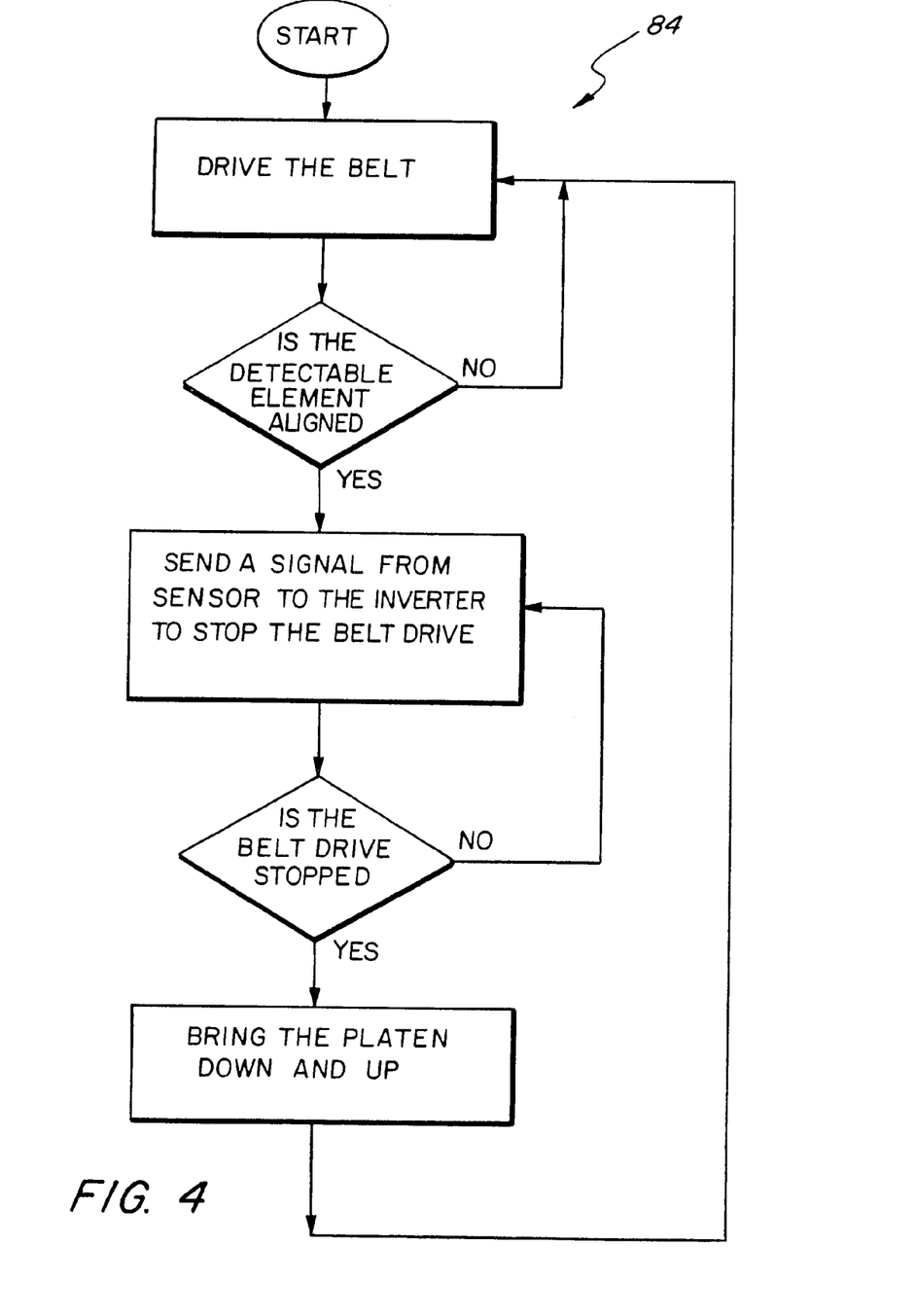
FIG. 4 is a flow chart generally depicting the sensor and feedback based decisions automatically made by the system.

As described above, the PLC 55 controls the movement of the belt 18. The PLC 55 also controls the movement of the platen 30. FIG. 4 shows a block diagram 84. Block diagram 84 is a flow diagram generally showing the logic that is implemented by a PLC 55. The belt is started by a user's input to the input/output device 40. The logic in the PLC 55 keeps the belt moving until a detectible element 16 is aligned with a sensor. As set forth in the second box of flow diagram 84, once a detectible element is aligned with a sensor, a signal is sent from the sensor to the inverter to stop the belt drive. Once the belt drive is stopped, (or can be detected to be at zero hertz), the PLC sends a command to bring the platen down and back up. This logical sequence is repeated until the tortilla press is turned off.

Figure 5:
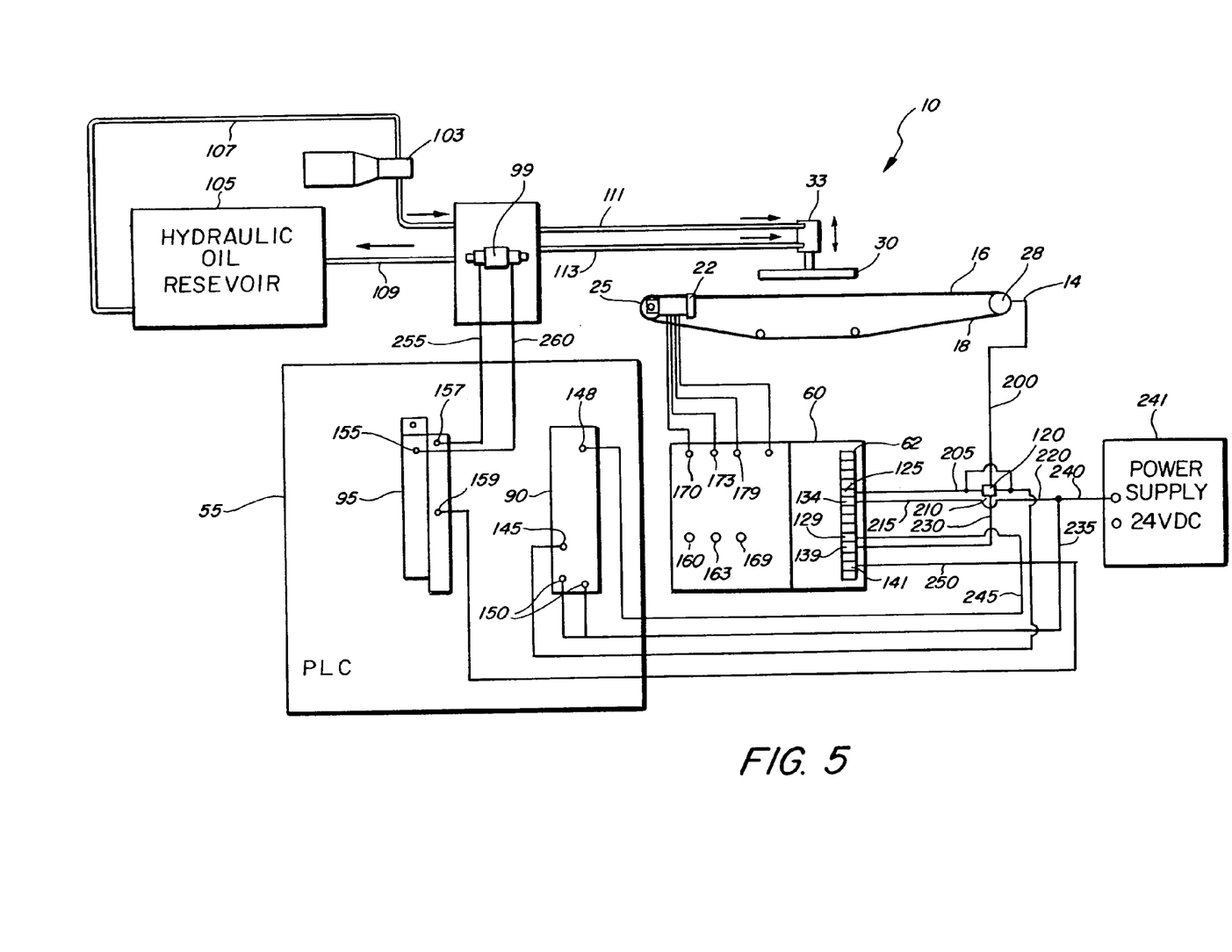
FIG. 5 is a schematic diagram depicting how the main components of the invention interact with each other.

FIG. 5 is a diagrammatic view showing lines carrying signals and power to depict the cycle of the single sensor tortilla press 10. As set forth above, the belt drive is started by an input via user through the input/output device 40. In response the program logic in the PLC 55 checks conditions to verify that the belt may be driven. For example, the PLC 55 checks to see if the platen 30 is up. If the conditions are met, the PLC 55 sends a signal from the output card 95 via wire 250 to terminal 13 labeled 141 of the inverter 60 to initiate the belt drive. The motor 22 continues to drive the belt 18 while the PLC monitors conditions. When a detectible element 16 passes within the range of view of sensor 14, an optical signal is sent by way of fiber optic line 200 to a teaching block 120 of sensor 14. Teaching block 120 is the sensing portion of sensor 14 and also converts the optical signal into an electrical signal. Hence, when the sensor detects the detectible element 16, an electrical signal is sent from the teaching block 120 to the inverter by way of wire 205. An electrical signal is simultaneously sent by way of wire 209 to the PLC.

The signal to the inverter 60 via line 205 initiates the belt drive stop. The simultaneous signal via line 209 to the PLC tells the PLC that a detectible element 16 has been sensed and to prepare for the next step in the ladder logic. Once the motor 22 comes to a complete stop, terminal 10, (labeled 129 in FIG. 5), of the inverter detects zero hertz and provides a signal in the form of a positive voltage output. The terminal 10 output, labeled 129, sends the signal to the PLC 55 via wire 245. As shown in the drawing, input card 90 receives the signal from line 245 at number 1, (labeled 148), of the input card 90. This signal satisfies a condition in the ladder logic to move to the next step in the logic, which tells the hydraulic cylinder 33 of the press 10 to come down. The actuation of the hydraulic cylinder 33 is caused by a command from the ladder logic via output card 95. As can be seen from FIG. 5, number 0, (labeled 157), on the output card 95 of the PLC 55 sends a signal via wire 255 to actuate the dual directional solenoid valve 99 of the hydraulic system powering the hydraulic cylinder 33. This brings the platen down. The ladder logic in the PLC then keeps the platen down for a predetermined length of time, using a timer, then sends a signal via number 1, (labeled 155) of the output card 95 via wire 260 to the solenoid valve 99 to bring the cylinder 33 and platen 30 back up. Then the ladder logic sends a signal from number 8, (labeled 159), of output card 95 via wire 250 back to the inverter 60 to start the belt drive once again and a cycle of the tortilla press has been completed.

Cycling is continuously repeated in accordance with the steps set forth above. After the first cycle, no manual start is required since the signal in wire 250 from number 8, (labeled 159), is automatically sent to the inverter 60 from output card 95 when the platen 30 goes up. The signal is received at the terminal 13, (labeled 141), of the inverter 60. From this point, the motor 22 continues to drive the belt 18 until another detectible element 16 is sensed or the tortilla press is turned off. The ladder logic is configured to continue this cycle to repeatedly and precisely bring the platen down at proper intervals to press the dough into flattened tortillas as the belt is incrementally moved forward. Furthermore, the ladder logic prevents the belt 18 from moving when the platen is down.

The teaching block 120 receives its power from a power source of the inverter 60 via wire 230 from terminal 11 of the terminal block 62 of the inverter 60. Alternatively, the teaching block 120 may receive its power from another, independent source. The power is 24 volts DC in the preferred embodiment. To complete the circuit, teaching block 120 is connected via a wire 210 to a zero volts or a minus 24 volts common by a branch of a Y from wire 210. The branch of the Y from wire 210 comprises wire 220, which goes to a terminal strip. Another branch of the Y comprises wire 215 from terminal 6, (labeled 134), of the inverter 60. In this way, the teaching block 120 and the inverter 60 have the same common voltage. Furthermore, another wire 235 from the terminal strip of the common is connected to the input card 90 of the PLC at DC common terminals, (labeled 150). This provides a common minus 24 volts for the PLC 55, as well as for the teaching block 120 and the inverter 60.

Figure 6:
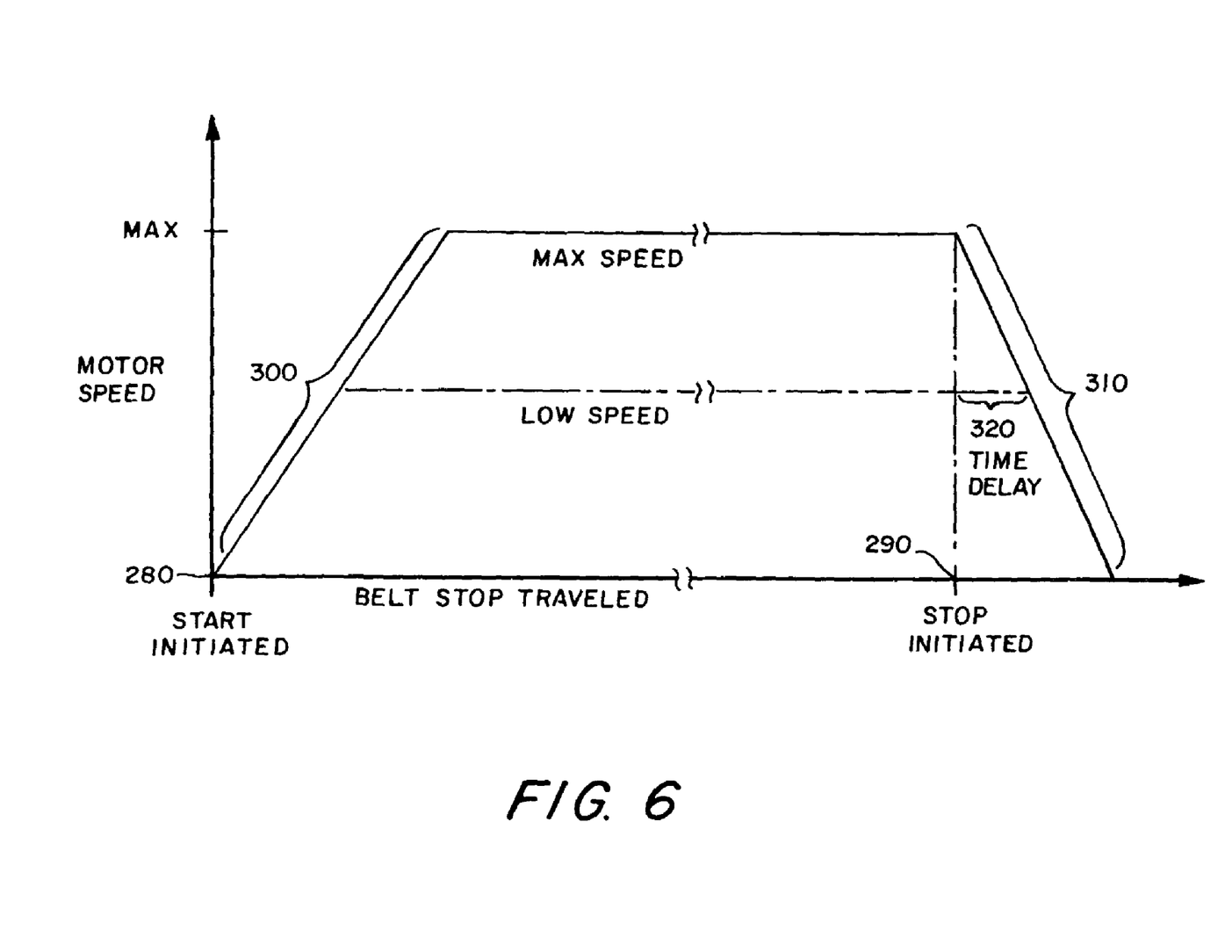
FIG. 6 is a graph showing the stop delay time and belt distance traveled vs. motor speed of the present invention.

The inverter has a means of programming so that the belt can be made to stop at a predetermined distance after the stop has been initiated. That is the belt 18 will travel a set distance after the stop has been initiated before it actually stops. This distance is independent of the motor speed. This feature is illustrated in the graph of FIG. 6. In FIG. 6, a start is initiated at 280 and an acceleration of the motor and the belt is provided at 300. When the belt moves at maximum speed, a certain minimum time is required for the belt to stop after the stop is initiated at 290. This length of time depends on the pre-selected deceleration. For a specific maximum speed and a specific deceleration there is a specific minimum time for a stopping the belt. This time is associated with a specific distance that the belt will travel before it actually comes to a stop. This relationship is important since it determines when the platen must come down to match the placement of dough and so that the platen 30 does not come down while the belt 18 is still moving. Deceleration 310 is generally set to be the same whether the tortilla press is running at a high speed or at a low speed. Thus, the programming of the inverter 60 becomes important. By proper programming, the inverter 60 accounts for the differences in speeds at which the press 10 may be run. For example, the inverter 60 provides a time delay associated with belt travel distance 320 when the belt is run at lower speeds. This is because the belt can be stopped in a shorter length of time and at a shorter distance of belt travel when the speed of the belt 18 and the motor 22 is lower than the maximum.

This feature together with the single sensor system described above provide for an efficient and accurate tortilla press system. The invention has been described in accordance with specific details above, and has been shown in the drawings as having many particulars. However, it is to be explicitly understood that there are many variations to these particulars that are considered to be within the spirit and scope of the invention. Therefore, the invention is to be limited only by the following claims.

I claim:

1. A single sensor actuation system for a driven belt of a tortilla press comprising:
   a signal emitting and retrieving sensor producing an emitted signal, retrieving a reflected signal, and sending a sensor return signal;
   an AC inverter, the sensor connected to the inverter;
   at least one detectable element that is permanently located in a fixed position on the belt and sensed by the sensor when said detectable element is aligned with the emitted signal of the sensor and generates the reflected signal; and
   a platen for pressing tortillas on the belt,
   the sensor retrieving the reflected signal from said detectable element and sending the sensor return signal to a motor driving the belt to stop driving the belt in response to the retrieving when the at least one detectable element is aligned with the emitted signal of the sensor,
   the AC inverter sending a signal to an actuator of the platen to bring the platen down to press a tortilla when the belt has stopped moving.

2. The single sensor system of claim 1, wherein the inverter includes a switch, and the motor has a lead connecting the motor to the inverter so that the switch closes when the motor goes to 0 Hz.

3. The single sensor system of 1, wherein the inverter and an associated Programmable Logic Controller (PLC) receive the sensor return signal from the sensor when a detectable element is detected by the sensor, and wherein the inverter stops the motor through a pre-programmed vector curve that is provided as an integral part of the inverter so that the belt moves a set distance past the point at which the retrieved signal was received by the inverter so that the belt travel after a retrieved stop signal is the same independent of the belt's original speed.

4. The single sensor system of claim 3, wherein consistency of a stopping distance enables a reduction in belt length of more than six percent.

5. The single sensor system of claim 3, wherein consistency of a stopping distance enables a reduction of approximately two tenths of a second per stroke of the platen.

6. The single sensor system of claim 3 wherein the sensor return signal received by the PLC satisfies a condition in a ladder logic of the PLC and prepares the ladder logic program to receive a subsequent condition of the motor going to zero hertz.

7. The single sensor system of claim 6 wherein the inverter detects zero hertz in the motor and automatically sends a drive stop signal via a wire to the PLC, the drive stop signal is received by said PLC and satisfies another condition of the ladder logic, and wherein the ladder logic effectuates a command to bring the platen down.

8. The single sensor system of claim 7 wherein the ladder logic effectuates a command to bring the platen back up after a predetermined length of time.

9. The single sensor system of claim 8 wherein the ladder logic automatically sends a signal to the inverter to restart the drive with minimal loss of time and space on the belt.

10. The single sensor system of claim 1, wherein the belt is a flexible belt surrounding at least one roller, and wherein the sensor is positioned juxtaposed to said at least one roller.

11. The single sensor system of claim 1, wherein the sensor is a fiber optic light sensor with capabilities of sensing multiple shades of color from the detectable element, and wherein the detectable element is a colored mark of a predetermined range of shades and color on the belt.

12. The single sensor system of claim 1, wherein the sensor is directly connected to a terminal block in the AC inverter and sends a sensor return signal to the motor to stop the belt in response to said retrieving when the at least one detectable element is aligned with the emitted signal of the sensor.

13. A method of actuating a second part of a tortilla machine in response to a detected position of a first part of the machine, the first part having a detectable element and the machine having a sensor for detecting the detectable element, comprising:
   detecting a first position of said first part of the machine by sensing the detectable element on the first part by the sensor;
   retrieving a returned signal from the detectable element and sending the returned signal from the sensor to an AC inverter when the first position is detected by the sensor;
   slowing the first part of the machine by a signal from the inverter to a drive of the first part;
   stopping the first part of the machine at a predetermined second position different from the first position; and
   actuating the second part of the machine when a signal from the drive of the first part of the machine goes to a zero frequency.

14. The method of claim 13, wherein the inverter has a switch that is normally open when connected to a non-zero frequency signal from the drive, said method further comprising:
   maintaining said switch open by sending said signal from said drive to said switch; and
   said actuating being initiated by closing said switch when said signal goes to zero frequency when the drive is stopped.

15. The method of claim 13, wherein said detectable element is a colored mark on said first part, said sensor is a fiber optic sensor, and the steps of detecting and retrieving further comprise:

sending a beam from the sensor to strike the detectable element when the detectable element is aligned with the beam; and
retrieving a reflected beam from the detectable element by the sensor and sending an electrical signal converted from the reflected beam to the inverter.

16. The method of claim 15, further comprising the preliminary step of teaching the sensor the color of the detectable element so that it is sensitive to the shades of the color that will be present during use.

17. The method of claim 13, wherein the tortilla press further comprises a Programmable Logic Controller (PLC), the method further comprising:
   sending said return signal to said PLC; and
   stopping the first part by way of a said return signal that was sent to said inverter.

18. The method of claim 17, said stopping further comprising stopping said drive of the belt through a pre-programmed vector curve that is provided as an integral part of the inverter so that the belt moves a set distance past a point at which the retrieved signal was received by the inverter so that the belt travel after a retrieved stop signal is the same independent of the belt's original speed.

19. The method of claim 18, further comprising reducing the necessary length of the belt by more than six percent by increasing the consistency of a stopping distance by said single sensor and said pre-programmed vector curve.

20. The method of claim 18, further comprising reducing a cycle time by approximately two tenths of a second by increasing the consistency of a stopping distance by said single sensor and said pre-programmed vector curve.

21. The method of claim 17, further comprising:
   coordinating movement of the first part of the tortilla press with movement of the second part of the tortilla press by way of the PLC;
   satisfying at least one condition of ladder logic in the PLC by receiving the sensor return signal in the PLC;
   detecting zero hertz in the belt drive by the inverter and automatically sending a drive stop signal to the PLC;
   satisfying at least another condition of the ladder logic in the PLC by receiving the drive stop signal in the PLC; and
   effectuating a command by the ladder logic to bring the platen down.

22. The method of claim 21, further comprising effectuating a command by ladder logic to bring the platen back up after a predetermined length of time.

23. The method of claim 22, further comprising automatically sending a restart signal by ladder logic control to the inverter to restart the belt drive with minimal loss of time and space on the belt.

* * * * *